N. BOWDITCH.
COTTON PICKING MACHINE.
APPLICATION FILED DEC. 18, 1905.

1,119,796.

Patented Dec. 8, 1914.
4 SHEETS—SHEET 1.

Witnesses,
Edward T. Wray.
Homer L. Kraft.

Inventor.
Nathaniel Bowditch.
by Parker & Carter
Attorneys.

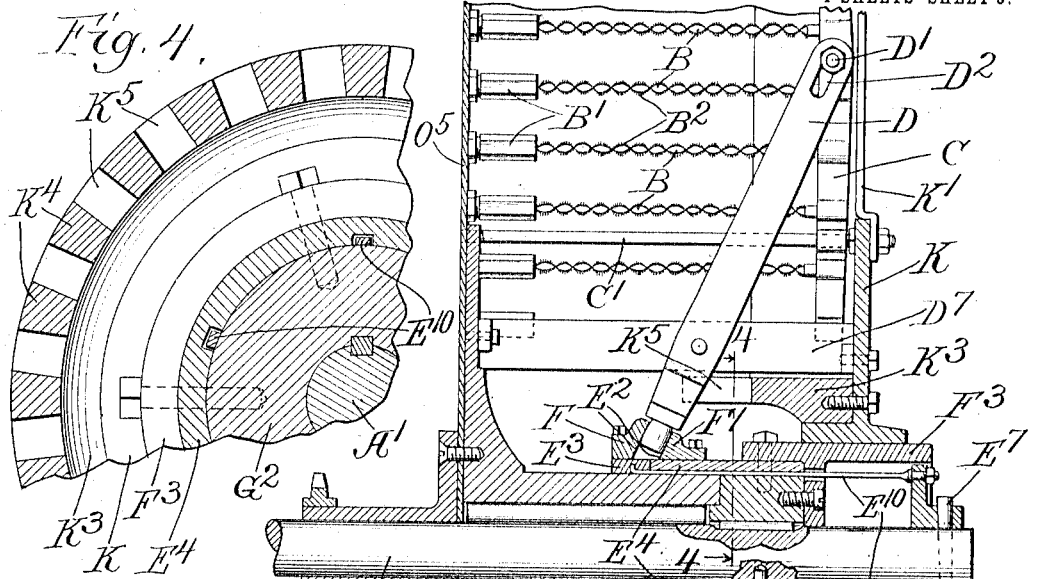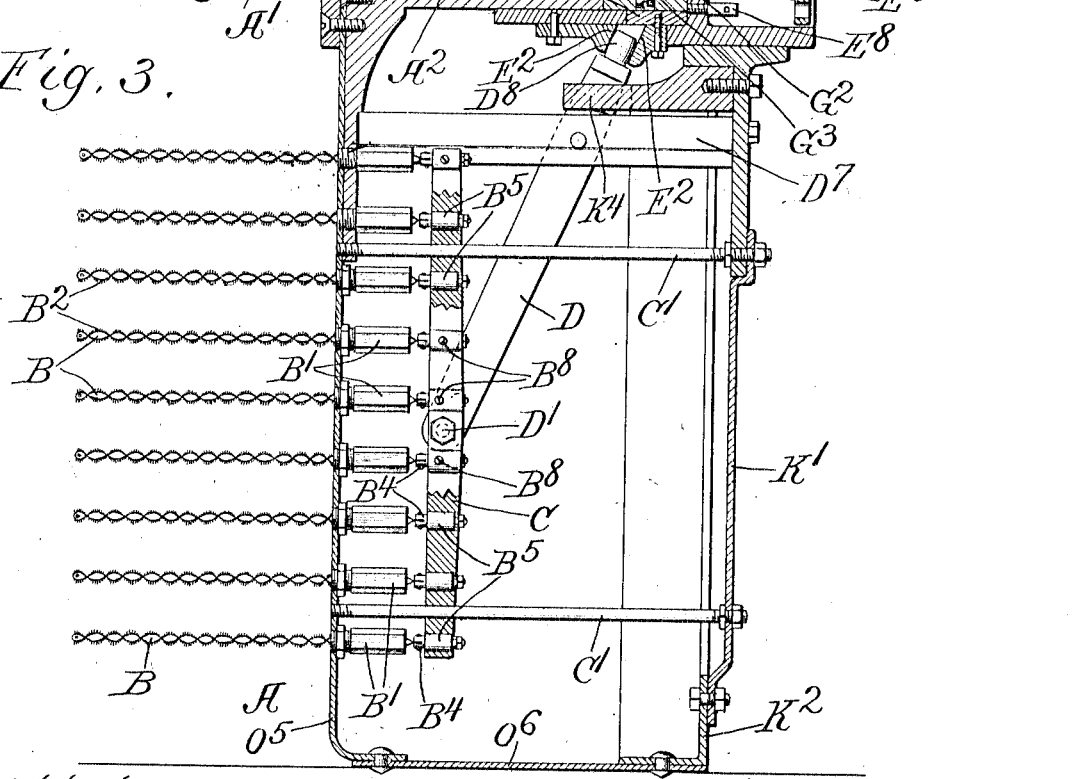

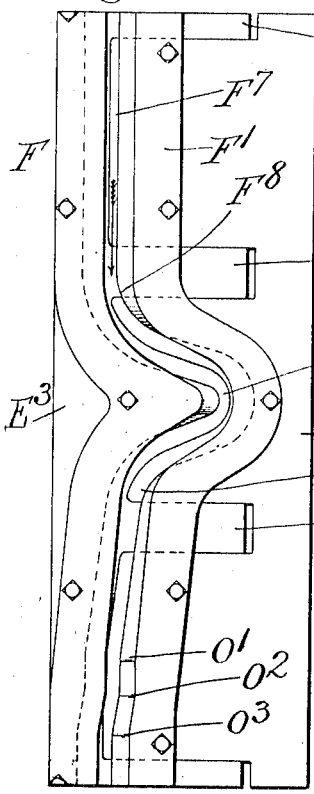
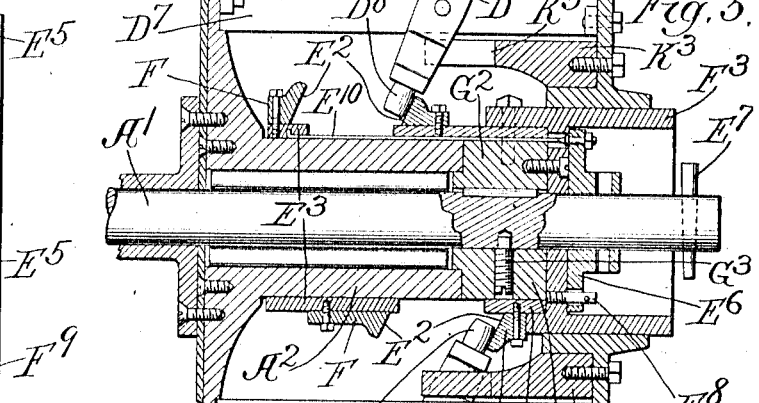
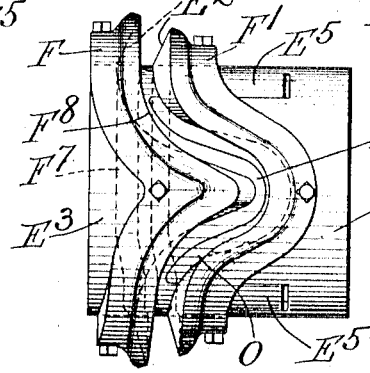
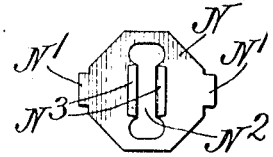
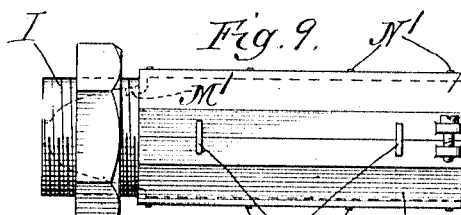
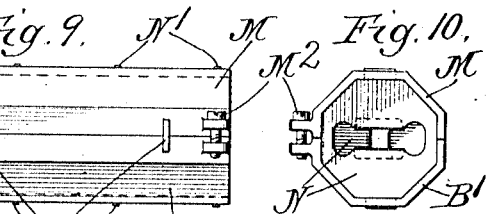
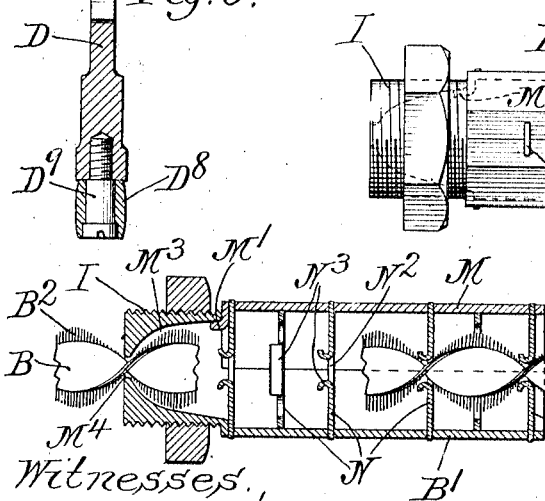
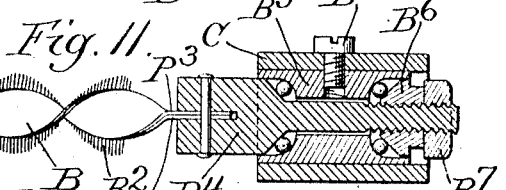

UNITED STATES PATENT OFFICE.

NATHANIEL BOWDITCH, OF AURORA, ILLINOIS.

COTTON-PICKING MACHINE.

1,119,796. Specification of Letters Patent. Patented Dec. 8, 1914.

Application filed December 18, 1905. Serial No. 292,204.

*To all whom it may concern:*

Be it known that I, NATHANIEL BOWDITCH, a citizen of the United States, residing at Aurora, in the county of Kane and State of Illinois, have invented a certain new and useful Improvement in Cotton-Picking Machines, of which the following is a specification.

My invention relates to cotton picking machines, and has for its object to provide a new and improved machine of this description.

My invention is illustrated in the accompanying drawings wherein—

Figure 1:
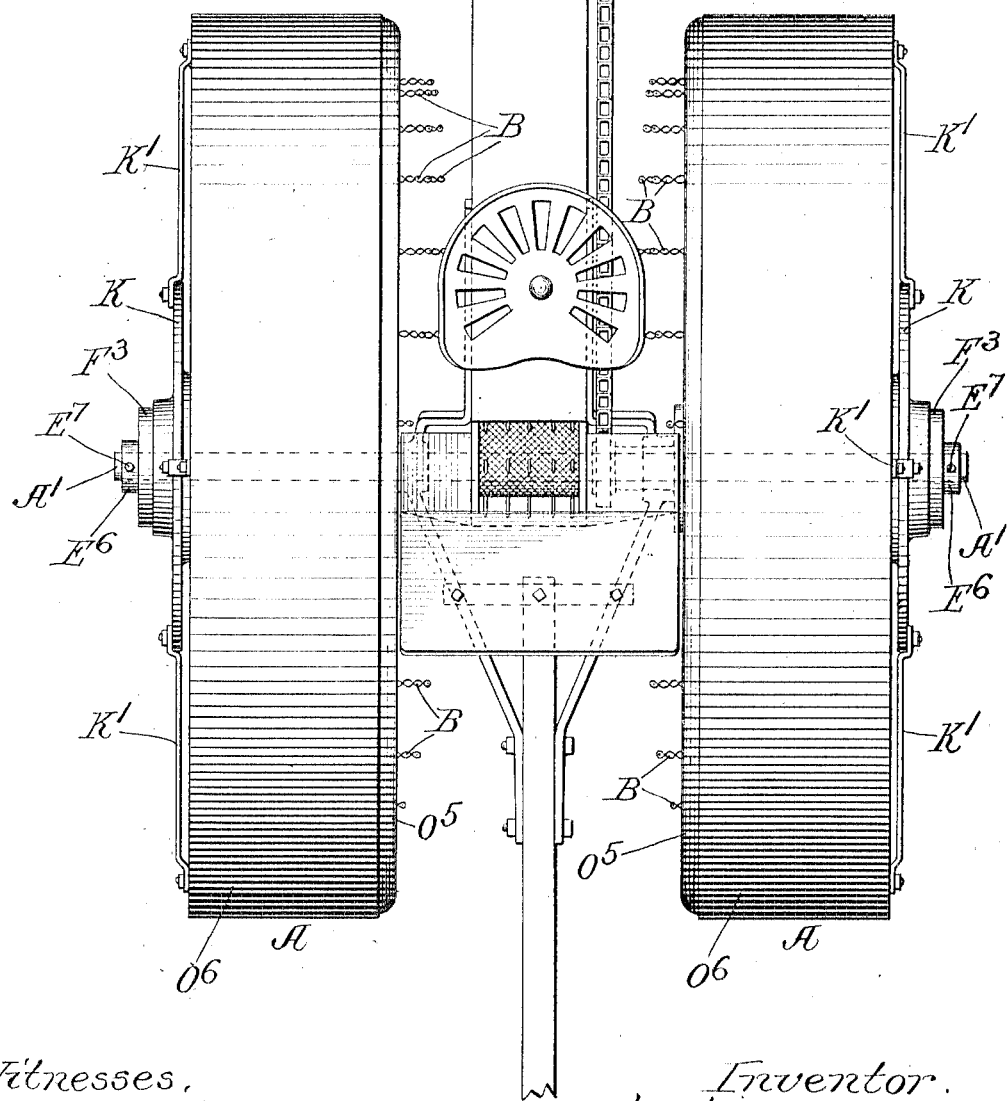
Figure 13:
Figure 14:
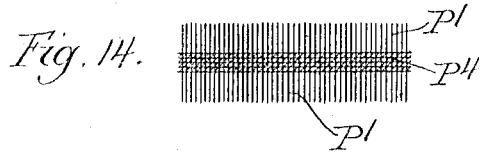
Figure 2:
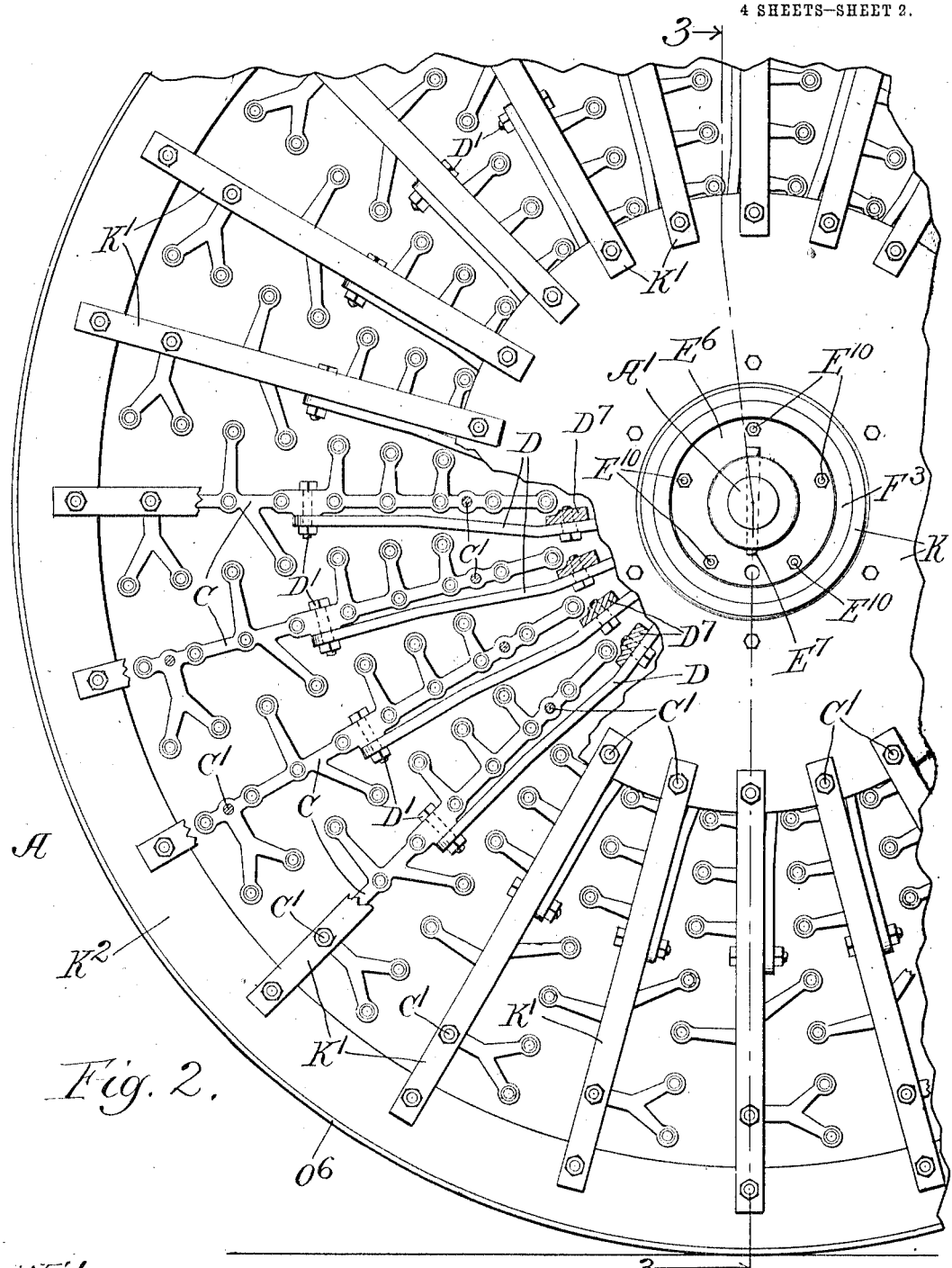

Figure 1 is a plan view of a cotton picking machine; Fig. 2 is a view of one of the wheels of the machine with parts broken away; Fig. 3 is a sectional view taken on line 3—3 of Fig. 2; Fig. 4 is a sectional view taken on line 4—4 of Fig. 3; Fig. 5 is a sectional view of the hub of the wheel shown in Fig. 3 with the parts moved so as to throw the pickers out of gear; Fig. 6 is a view of the guiding device for the actuating levers; Fig. 7 is a view of the guiding device for the actuating levers developed or flattened out; Fig. 8 is a sectional view through the end of one of the actuating levers; Fig. 9 is a view of one of the guides for the spiral pickers; Fig. 10 is an end view of the guide shown in Fig. 9; Fig. 11 is a sectional view through one of the guides and the picker supporting bar; Fig. 12 is a view of one of the engaging devices through which the picker passes; Fig. 13 is a view of a portion of the woven wire material used in making one form of picker; Fig. 14 is a view showing a portion of a picker and the method of attaching the woven wire.

Like letters refer to like parts throughout the several figures.

The cotton picking device herein shown is provided with two wheels, A, mounted upon an axle, $A^1$. A series of spiral cotton picking devices, B, are associated with each wheel. These picking devices pass through guides $B^1$ attached to the wheel and are provided with flexible picker points, $B^2$, which project laterally therefrom, and which engage the cotton when the device is operated. In operating the machine it is pulled along the row of cotton, one wheel being on each side of the row. The spiral pickers when opposite the cotton are pushed through the wheel, and at the same time rotated, the picker points engaging the cotton so as to wrap it about the picker and tear it from the cotton bolls. The pickers are then withdrawn into the wheel and the cotton wiped off, said cotton then dropping into a suitable receiving device. The spiral pickers B are connected to picker bars C, a series of pickers being connected to each bar, the bars mounted radially about the wheel. These bars are carried upon the guide rods $C^1$ and are moved back and forth therealong by means of the levers D. These levers are connected by a suitable connection, such as the bolts $D^1$, with the bars C and are provided with a slot $D^2$ to permit relative movement of the parts. The levers D are pivotally connected to supporting parts $D^7$ which are fixed to the wheel. The ends of the levers pass between the guiding devices F and $F^1$. I prefer to provide the ends of the actuating levers D with rollers $D^8$ (see Fig. 8) which are fastened thereto in any desired manner, as by the bolts $D^9$. These rollers fit in between the guiding devices F and $F^1$ and are preferably cone-shaped or at least curved so that the ends are smaller in diameter than the middle portion. The faces $E^2$ of the guiding devices F and $F^1$ are inclined and the incline varies at different parts of the guiding devices, the incline being such as to make these faces substantially parallel to the levers D as they move about the axle $A^1$ and are thus moved about their pivotal connection with the piece $D^7$. It will be seen that by this construction the slot formed between the guiding devices F and $F^1$ instead of being perpendicular to the axle is inclined with relation to said axle, the incline varying from point to point about the axle. The incline of the faces $E^2$ will be readily understood by reference to Figs. 3, 5, 6 and 7. By arranging the guiding devices F and $F^1$ so as to make the slot between them change in direction it will be seen that the levers D when they come to this change in direction will be moved about their pivotal point, and if the change of direction of the guiding devices F and $F^1$ is toward the right in Fig. 3 the outer ends of the levers D will be moved toward the left so as to thrust the pickers B through the guides $B^1$. When the incline is in the opposite direction the levers will be moved so as to withdraw the pickers within the wheel. This movement of the pickers in and out causes them to rotate about their axis because of the fact that they are spiral shaped and pass through guides which engage the spirals so as to produce such rotation. When the pickers rotate and are in contact with the cotton plant the picker points $B^2$ engage the cotton causing it to wrap about the pickers thus tearing it from the cotton bolls. Since the pickers are only in contact with the cotton plants a comparatively short time, on account of the fact that the machine is moving forward, it becomes desirable to cause the pickers to rotate rapidly while this contact is being made. In other words under ordinary conditions the pickers are in an effective position only during a part of the revolution of the wheels and hence they should be made to rotate rapidly during this effective period. It is also desirable to, as it were, withhold them in the wheels until they come opposite the cotton plants and then thrust them out rapidly between the branches of the plants. Ordinarily the most effective position of the pickers is when they are near the ground.

Referring to Fig. 7 wherein I have shown the guiding devices F and $F^1$ developed or flattened out, it will be noted that the guiding devices and hence the slot between them are straight for a portion of their length. If, for example, the end of the lever D is at the point $F^7$ the pickers are entirely withdrawn within the wheel and guides. As the lever moves along the straight portion of the slot there is no longitudinal movement of the pickers. When the lever reaches the point $F^8$, that is, the point where the guiding devices and the slot bend, the inner end of the lever is thrown quickly to the right thus causing the upper end of the lever to be thrown to the left so as to push the pickers out through the guides. The pickers are then rotated very rapidly because of the fact that they are thrust from the wheel toward the cotton at a comparatively high rate of speed. When the lever reaches the point $F^9$ the picker is thrust the maximum distance into the cotton plant. At this point the guiding devices bend in the opposite direction, and as the lever continues to move the inner end is suddenly moved in the opposite direction. This causes the outer end to move so as to withdraw the pickers from the cotton. When the lever reaches the point O the acute incline ceases. The arrangement is such that at this point the pickers are not completely withdrawn into the wheel. The guiding devices from O to $O^1$ are then only slightly inclined so as to gradually withdraw the pickers into the wheel. At the point $O^1$ the guiding devices are arranged so that the slot is straight from the point $O^1$ to the point $O^2$, the slot then inclines to the point $O^3$ so as to quickly move the pickers completely in and cause the cotton to be all wiped off by contact with the outer face of the wheel. It will thus be seen that as the wheel rotates and the pickers come opposite the cotton plants they are suddenly thrust into the cotton plants and at the same time given a rapid rotation. When the pickers have been thrust their full length into the cotton plants the motion is reversed and they are pulled rapidly from the cotton plants into the wheel until only a comparatively small portion thereof projects from the wheel. During the further rotation of the wheel they are withdrawn slowly into the wheel. When the pickers because of the rotation of the wheel reach a point above the hopper, the cotton, because of the partial withdrawal into the wheel, has accumulated at the end. When the picker reaches the point above the hopper the picker is suddenly withdrawn into the wheel, and the cotton wiped off on the face of the wheel, said cotton falling into the hopper.

The guiding devices F and $F^1$ are mounted upon the sleeves $E^3$ and $E^4$ surrounding the wheel hub. The sleeve $E^4$ is connected with the axle so as not to rotate as the axle is non-rotating and the sleeve $E^3$ is fastened thereto by means of interlocking projections $E^5$ (see Fig. 7). Means are provided for disconnecting the sleeve $E^3$ from the sleeve $E^4$ and moving the sleeve $E^3$ to one side to move the guiding device F away from the guiding device $F^1$ so as to throw the mechanism out of gear. Any suitable construction for this purpose may be used. As herein shown a series of rods $E^{10}$ are connected with the ring $E^3$ (see Figs. 3, 4 and 5). These rods are arranged to operate in proper grooves and are connected with a holding piece $E^6$ which is normally attached to the axle as by means of the pin $E^7$. When it is desired to throw the apparatus out of gear this pin is removed and the part $E^6$ moved into the position shown in Fig. 5. A pin $E^3$ engages the holding piece $E^6$ when in the position shown in Fig. 5 and a cotter pin may be passed therethrough so as to prevent the apparatus from being accidentally moved into gear. Surrounding the axle is a piece $G^2$ connected with the axle by a suitable key and arranged so as to be held against longitudinal movement by the screw $G^3$. A cylindrical supporting device $F^3$ also surrounds the axle and is fastened to the piece $G^2$ in any desired manner, as by means of suitable bolts. Mounted upon the supporting device is an annular disk K rotating with the wheel and to which is connected a series of braces $K^1$, said braces being connected at the other ends to the periphery of the wheel. In this case an angle iron K² has one side connected to the flange or periphery of the wheel, the braces K¹ being connected to the other side as shown. Attached to the disk K is an engaging device K³ coöperating with the levers D. This engaging device is provided with a series of projections K⁴ (see Fig. 4) separated by a series of spaces K⁵. The levers D pass between the projections K⁴ and said projections engage said levers between their ends so as to relieve the lateral strain when the pickers are in contact with the cotton plants and prevent the levers from being moved out of position laterally.

The spiral pickers B are mounted in the picker bars C so as to be rotatable. This result may be secured in any desired manner. As herein shown each picker B is connected to an end-piece B⁴ which passes through an opening in the picker bar C. Within this opening is a bushing B⁵ (see Fig. 11) having enlarged openings at the ends to receive balls. The end-piece B⁴ is enlarged at one end and is provided at the other end with an engaging piece B⁶ arranged to engage the balls so as to hold them in position. A locking nut B⁷ is attached to the end of the end-piece. The bushing B⁵ is held in place by a screw B⁸. It will thus be seen that each of the pickers is provided with a ball bearing at the point where it connects with the picker bar. In this construction the guiding devices B¹ through which the spiral pickers pass are provided with a threaded part I preferably integral with the body portion of the guiding device. There is also provided a removable piece M which extends up to the threaded part I and which is provided with a projection M¹ which projects into the threaded part. The removable part is held in place in any desired manner as by means of screws M² which pass through lugs on the guiding device and the removable part. The guiding devices are provided with a series of engaging pieces N which are preferably made out of thin material and which are provided with projections N¹. These engaging pieces are provided with slots N² which are enlarged at the ends (see Fig. 12). At the middle portion of the slot the material of the plate is turned up so as to form the rounded engaging faces N³. These engaging faces are placed in the guiding devices at suitable intervals. I prefer to place them a distance apart equal to one-half the pitch of the spiral, and in this event the slots N² of the adjacent engaging pieces will be at right angles to each other. The guiding devices B¹ and the removable pieces M are provided with slots into which are received the projections N¹ (see Figs. 9 and 11). It will thus be seen that when the guiding device B¹ and the removable piece M are clamped together the engaging pieces will be securely held in place. The screw threaded end I of each guiding device is provided with inclined faces M³ which guide the end of the picker toward the slot M⁴ in the end thereof.

It will be noted that in this construction the wheel is provided with a web O⁵ and that there is a periphery O⁶ projecting at substantially right angles therefrom. The outer edge of this periphery is provided with supporting means which as herein shown consist of the angle iron K², parts K¹, K and F³, thus supporting the weight upon the axle A¹. The part K rotates about the part F³, said latter part being connected with the axle. It will be seen that by this construction there is provided a wheel wherein all of the actuating mechanism is contained within the wheel proper, that is, within the space between the web and the supporting means for the periphery.

The spiral pickers may be made in any desired manner as, for example, by placing a piece of hair cloth between two bands of steel twisted in a spiral form so as to leave the ends of the hair projecting to form the picker points B².

In Figs. 13 and 14 I have shown a modified construction of picker. When the hair cloth is used there are certain objectionable features which are not present with the modified construction wherein the picker is entirely metallic, including the picker points. The form of guide herein shown, wherein the engaging plates N are provided with slots with enlarged end openings, minimizes the wear on the picker point as it permits said picker points to move freely through the guides without injurious engagement therewith. In Fig. 13 I have shown a piece of woven wire consisting of a series of longitudinal strands, P, and a series of cross strands, P¹, woven together, the cross strands projecting at each side beyond the longitudinal strands, thus providing a series of projecting points on each side. This woven wire is then placed between two bands, P² and P³, of metal, preferably steel, the whole formed into a spiral shape. Some means is provided for fastening the cross wires to the two bands so as to prevent them from working out and thus becoming displaced. As herein shown, I secure this result by a small strip of solder, P⁴, run along near the middle of the group of longitudinal wires so as to bind the cross wires in position. This solder may be applied before the wires are placed between the bands, but may be applied when the wires are in contact with one of the bands so as to cause them to so adhere to the band. This construction holds the picker points in rigid position with relation to the longitudinal wires so that they cannot be pulled out, said picker points being held firmly against endwise movement. This also prevents unequal displacement of the picker points, and insures their remaining in their proper position. One way, for example, of making the woven wire is to make the cross wires of tempered material and the longitudinal wires of soft material so that the longitudinal wires can bend around the cross wires and yet the cross wires will be strong and elastic. I prefer to have the cross wires which form the picker points extend quite a distance beyond the longitudinal wires so as to give greater flexibility. The woven wire may be placed between the bands either before or after they are formed into the spiral. Fig. 11 shows a picker when the parts are all in position, the picker points only of the woven wire being exposed.

I claim:

1. A cotton picking device comprising a reciprocating picker, an actuating pivoted lever connected at one end therewith on one side of its pivotal point, a cam device directly engaging the other end of said lever on the other side of the pivotal point, and means for moving the lever and the cam device relatively so as to actuate the lever and reciprocate the picker.

2. A cotton picking device comprising a rotatable wheel, a series of guides carried thereby, a series of cotton pickers adapted to be reciprocated in said guides, an actuating lever connected with said cotton pickers, a non-rotating cam device engaging the end of said lever so that when the wheel rotates the pickers will be reciprocated.

3. A cotton picking device comprising a spiral reciprocating cotton picker, a lever connected therewith and pivoted between its ends, two cam devices between which one end of said lever projects, and means for moving the lever with relation to the cam devices so as to actuate the picker, said lever and pickers moving about a common axis when in operation.

4. A cotton picking device comprising a spiral reciprocating cotton picker, a lever connected therewith and pivoted between its ends, two cam devices between which one end of said lever projects, and means for moving the lever with relation to the cam devices so as to actuate the picker, the opposed faces of said cam devices being inclined, and mechanism for rotating said lever and pickers about a common axis.

5. A cotton picking device comprising a spiral reciprocating cotton picker, a lever connected therewith and pivoted between its ends, two cam devices between which one end of said lever projects, and means for moving the lever with relation to the cam devices so as to actuate the picker, the opposed faces of said cam devices being inclined, the incline of said faces changing from point to point, and mechanism for rotating said lever and pickers about a common axis.

6. A cotton picking device comprising a spiral reciprocating cotton picker, a lever connected therewith and pivoted between its ends, two cam devices between which one end of said lever projects, and means for moving the lever with relation to the cam devices so as to actuate the picker, the opposed faces of said cam devices at the points where the lever engages them being substantially parallel with said lever, and mechanism for rotating said lever and pickers about a common axis.

7. A cotton picking device comprising a wheel, a series of guides carried thereby, a series of spiral cotton pickers adapted to be reciprocated in said guides, a bar to which said cotton pickers are connected, an actuating lever pivoted between its ends and connected at one end with said bar, two cam devices connected with the axle of the wheel, the other end of said bar extending between said cam devices.

8. A cotton picking device comprising a wheel, a series of guides carried thereby, a series of spiral cotton pickers adapted to be reciprocated in said guides, a reciprocating bar associated with said spiral pickers, a ball bearing connection between each of said spiral pickers and said reciprocating bar, a lever connected with said bar so as to be free to move with relation thereto, said lever pivoted between its ends, two non-rotating cam devices between which the other end of said lever extends, said cam devices arranged so as to cause the lever to rock when the wheel is rotated to reciprocate the pickers.

9. A cotton picking device comprising a reciprocating cotton picker, an actuating lever pivoted between its ends having one end connected with said picker, a cam device associated with the other end of said lever adapted to rock it about its pivot when the lever is moved with relation thereto, and a strain relieving device coöperating with said lever so as to relieve the lateral strain due to the contact of the cotton picker with the cotton plant.

10. A cotton picking device comprising a wheel, a series of rotatable pickers mounted thereon, a series of picker bars to which said pickers are connected, a series of actuating levers connected with said picker bars, said actuating levers mounted on pivots intermediate their ends, two cam parts between which one end of said actuating levers project, said cam parts changing in direction at predetermined points so as to rock the said levers.

11. A cotton picking device comprising a wheel, a series of rotatable pickers mounted thereon, a series of picker bars to which said pickers are connected, a series of actuating levers connected with said picker bars, said actuating levers mounted on pivots intermediate their ends, two cam parts between which one end of said actuating levers project, said cam parts changing in direction at predetermined points so as to rock the said levers, engaging devices connected with the wheel between which said actuating levers pass and which relieve the lateral strain thereon due to the contact of the cotton picker with the cotton plant.

12. A cotton picking device comprising a wheel, a series of pickers mounted thereon, an actuating device for said pickers comprising two non-rotatable cam parts, two sleeves upon which said parts are mounted, said sleeves having interlocking projections, one of said sleeves rigidly connected with the axle of the wheel.

13. A cotton picking device comprising a wheel, a series of pickers mounted thereon, an actuating device for said pickers comprising two non-rotatable cam parts, two sleeves upon which said parts are mounted, said sleeves having interlocking projections, one of said sleeves rigidly connected with the axle of the wheel, and means for moving the other sleeve to one side so as to separate the cam parts and throw the apparatus out of gear.

14. A cotton picking device comprising a wheel, a series of reciprocating cotton pickers mounted thereon, a series of reciprocating bars to which said pickers are connected, a series of actuating levers mounted upon pivots intermediate their ends and connected at one end with said reciprocating bars, two non-rotatable cam devices between which the ends of said levers project, said cam devices changing in direction at predetermined points so as to actuate the levers when the wheel is rotated, each of said cam parts mounted upon a sleeve, said sleeves having interlocking parts which engage when the guiding parts are in their operative position, one of said sleeves connected with the axle of the wheel, a controlling device connected with the other sleeve and arranged so that said latter sleeve may be moved to one side so as to separate the cam parts to throw the machine out of gear.

15. A cotton picking device comprising a wheel, a series of reciprocating cotton pickers mounted thereon, a series of actuating levers mounted upon pivots intermediate their ends and connected with said cotton pickers, means for rocking said levers about their pivots when the wheel is rotated, an engaging device mounted upon the wheel so as to rotate therewith and provided with a series of projections between which said actuating levers move.

16. A cotton picking device comprising a wheel provided with a web, a periphery extending laterally from said web, supporting means for the outer edge of said periphery extending therefrom to the axle so as to support the outer edge of said periphery by the axle, a series of cotton pickers mounted upon said wheel between the web and said supporting means, an actuating mechanism for said pickers, all the parts of said actuating mechanism located between the web and said supporting means so as to be entirely within the wheel.

17. A cotton picking device comprising a wheel, a series of pickers mounted thereon, a series of reciprocating bars connected with said pickers, a series of actuating levers connected with said bars, and a non-rotatable cam device directly engaged by said actuating levers.

18. A cotton picking device comprising a reciprocating picker, an actuating lever connected therewith and provided at one end with a roller smaller in diameter at the ends than at the middle, a non-rotating cam device engaging said roller, and means for moving the lever and the cam device relatively to actuate the lever and reciprocate the picker and means for rotating said picker.

19. A cotton picking device comprising a rotatable wheel, a series of guides carried thereby, a series of spiral cotton pickers adapted when reciprocated through said guides to be rotated, said cotton pickers provided with picking points, a series of picker bars connected with said wheel to which said pickers are rotatably connected, a series of actuating levers connected with said picker bars, said levers mounted upon pivots so as to be free to rock, a roller connected with the end of each of said levers, two non-rotating cam devices having a space between them, the said rollers projecting into said space, said cam devices changing in direction at predetermined points so that when the wheel is rotated the levers will be actuated.

20. A cotton picking device comprising a reciprocating picker consisting of two metallic bands with woven wire between them having longitudinal wires and cross wires, the cross wires projecting at each side beyond the longitudinal wires, means for fastening these cross wires against endwise displacement, the whole formed into spiral shape, a guide having slots through which the picker passes, an actuating lever connected with said picker, a cam device directly engaging one end of said lever, and means for moving the lever and the cam device relatively so as to actuate the lever and reciprocate the picker.

21. A cotton picking device comprising a spiral cotton picker made up of two bands formed into a spiral, a series of longitudinal wires between said bands, and a series of cross wires also between said bands, the cross wires projecting beyond the edges thereof, and means for connecting the cross wires to the longitudinal wires so as to prevent lateral displacement of the cross wires, a rotatable wheel upon which said pickers are mounted, a series of guides carried thereby and in which said pickers are reciprocated, an actuating lever connected with said pickers, a non-rotating cam device engaging the end of said lever so that when the wheel rotates the pickers will be reciprocated.

22. A cotton picking device comprising a spiral cotton picker made up of two bands formed into a spiral, a series of longitudinal untempered wires between said bands, and a series of tempered cross wires also between said bands around which said untempered wires are bent, the cross wires projecting beyond the edges of the bands so as to form the picker points, a rotatable wheel upon which said pickers are mounted, a series of guides carried thereby and in which said pickers are reciprocated, an actuating lever connected with said pickers, a non-rotating cam device engaging the end of said lever so that when the wheel rotates the pickers will be reciprocated.

23. A cotton picking device comprising a spiral cotton picker made up of two bands formed into a spiral, a series of longitudinal untempered wires between said bands, and a series of tempered cross wires also between said bands around which said untempered wires are bent, the cross wires projecting beyond the edges of the bands so as to form the picker points, and means for preventing endwise displacement of the cross wires, a rotatable wheel upon which said pickers are mounted, a series of guides carried thereby and in which said pickers are reciprocated, an actuating lever connected with said pickers, a non-rotating cam device engaging the end of said lever so that when the wheel rotates the pickers will be reciprocated.

24. A cotton picking device comprising a guide having two separable pieces, a series of engaging pieces provided with slots and also provided on opposite sides with projections, said projections passing into openings in the two parts of the guide, and means for fastening the two parts together to hold the engaging pieces in place, a wheel upon which said guide is mounted, a spiral cotton picker reciprocating in said guide, an actuating lever connected with said picker, a non-rotating cam device engaging the end of said lever so that when the wheel rotates the picker will be reciprocated.

25. A cotton picking device comprising a guide having two separable pieces, a series of engaging pieces provided with slots the edges of the material being bent laterally so as to form curved faces for the slots, the material of the engaging devices being cut away so as to form enlarged ends to said slots, said engaging pieces also provided on opposite sides with projections, said projections passing into openings in the two parts of the guide, and means for fastening the two parts together to hold the engaging pieces in place, a wheel upon which said guide is mounted, a spiral cotton picker reciprocating in said guide, an actuating lever connected with said picker, a non-rotating cam device engaging the end of said lever so that when the wheel rotates the picker will be reciprocated.

26. A cotton picking device comprising a reciprocating picker, an actuating lever therefor, a rotatable part upon which said lever is mounted, said lever connected with said picker, and means for rocking said lever to reciprocate the picker.

27. A cotton picking device comprising a reciprocating picker, a part to which it is directly connected, an actuating lever therefor having one end directly connected with said part, a cam device also engaging said lever, and means for moving the lever and the cam device relatively so as to actuate the lever and reciprocate the picker.

28. A cotton picking device comprising a reciprocating picker, a part to which it is directly connected, means for confining the movement of said part to a path parallel to the movement of said picker, an actuating lever connected with said part, a cam device also engaging said lever and means for moving the lever and the cam device relatively so as to actuate the lever and reciprocate the picker.

29. A cotton picking device comprising a picker, a part to which it is connected, a guiding device for said part, a pivoted arm connected with said part, a cam engaging the other end of said arm, said cam located in a plane intermediate the ends of said guiding device.

30. A cotton picking device comprising a picker, a part to which it is connected, a guide for said part along which is moves, a pivoted lever connected at one end with said part, a cam engaging the other end of said lever, said lever located intermediate the ends of said guide.

31. A cotton picking device comprising a picker, a part to which it is connected, an actuating cam and a rigid one piece lever connecting said part with said cam.

NATHANIEL BOWDITCH

Witnesses:
 HOMER L. KROFT,
 PERCIVAL W. TRUMAN.